(12) United States Patent
Rodgers et al.

(10) Patent No.: US 7,990,968 B2
(45) Date of Patent: Aug. 2, 2011

(54) METHOD AND APPARATUS FOR DEMULTIPLEXING, MERGING, AND DUPLICATING PACKETIZED ELEMENTARY STREAM/PROGRAM STREAM/ELEMENTARY STREAM DATA

(75) Inventors: Stephane W. Rodgers, San Diego, CA (US); Ut Nguyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 652 days.

(21) Appl. No.: 11/394,421

(22) Filed: Mar. 31, 2006

(65) Prior Publication Data

US 2006/0268942 A1   Nov. 30, 2006

Related U.S. Application Data

(60) Provisional application No. 60/685,781, filed on May 31, 2005, provisional application No. 60/685,986, filed on May 31, 2005, provisional application No. 60/685,779, filed on May 31, 2005.

(51) Int. Cl.
*H04L 12/56* (2006.01)

(52) U.S. Cl. .................................. 370/392; 370/474

(58) Field of Classification Search .................. 370/389, 370/392, 466, 535, 542–544; 725/131–132, 725/151–152
See application file for complete search history.

(56) References Cited

U.S. PATENT DOCUMENTS

| | | | | |
|---|---|---|---|---|
| 5,652,749 A | * | 7/1997 | Davenport et al. | 370/466 |
| 5,959,659 A | * | 9/1999 | Dokic | 725/152 |
| 6,275,507 B1 | * | 8/2001 | Anderson et al. | 370/487 |
| 2004/0258060 A1 | * | 12/2004 | Liu et al. | 370/389 |

* cited by examiner

*Primary Examiner* — Ricky Ngo
*Assistant Examiner* — Pao Sinkantarakorn
(74) *Attorney, Agent, or Firm* — McAndrews, Held & Malloy, Ltd.

(57) ABSTRACT

Presented herein are method(s) and apparatus for demultiplexing, merging, and duplicating packetized elementary stream/program stream/elementary stream data. In one embodiment, there is presented a method for processing data. The method comprises receiving a bitstream wherein said bitstream comprises a plurality of streams; mapping the plurality of streams to a plurality of identifiers; packetizing the plurality of streams, thereby resulting in a plurality of packets, and wherein each packet further comprises: a portion of only one of the plurality of streams; and a particular one of the identifiers, wherein the particular one of the identifiers is mapped to the only one of the plurality of streams.

38 Claims, 5 Drawing Sheets

FIGURE 2 (Substitute Sheet)

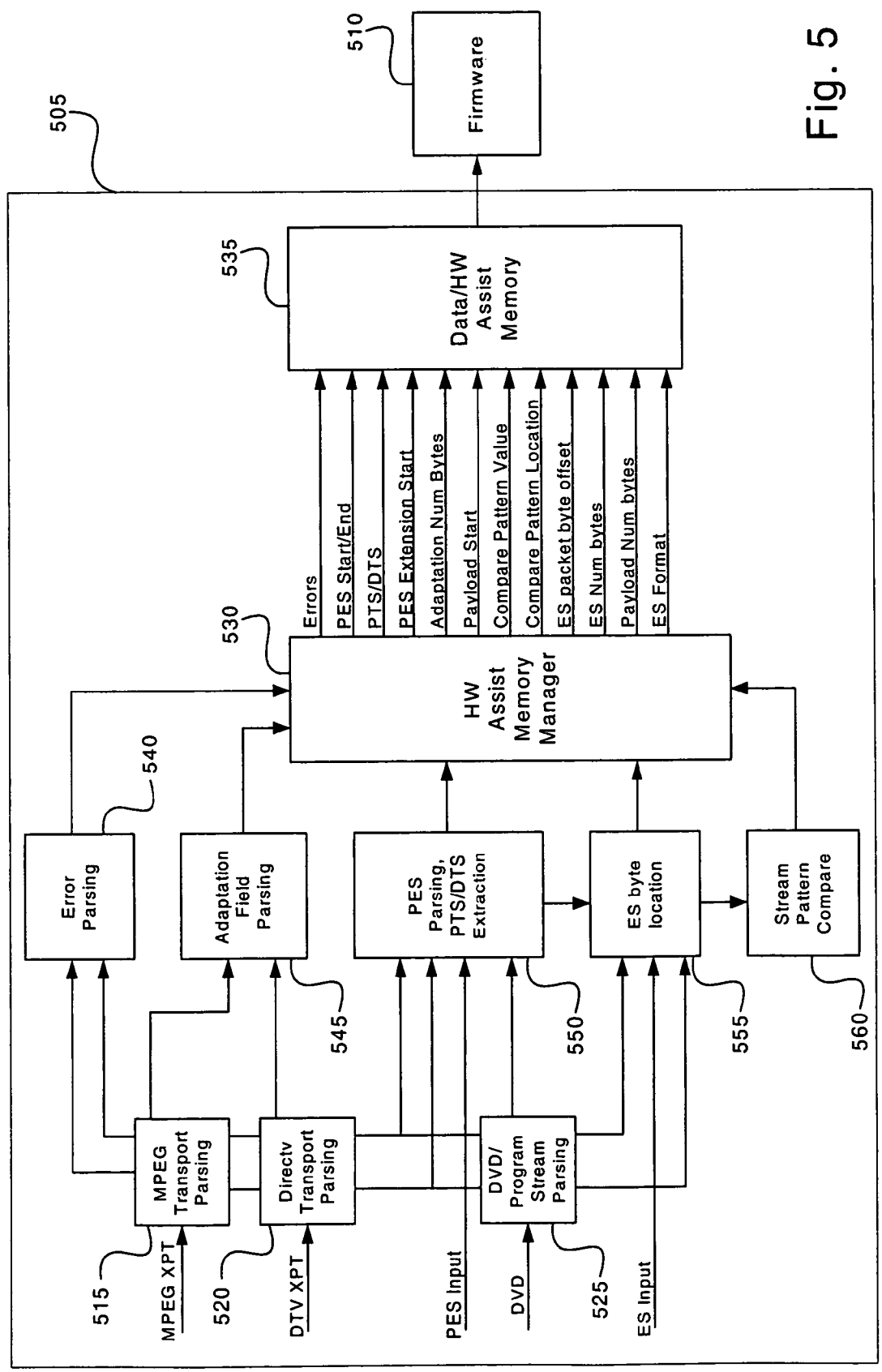

METHOD AND APPARATUS FOR DEMULTIPLEXING, MERGING, AND DUPLICATING PACKETIZED ELEMENTARY STREAM/PROGRAM STREAM/ELEMENTARY STREAM DATA

RELATED APPLICATIONS

This case is related to the following applications, each of which are incorporated by reference herein for all purposes:

| Serial # | Claims priority to: | Title | Inventor(s) | Date of Filing |
|---|---|---|---|---|
| 60/685,781 | | METHOD AND SYSTEM FOR ARCHITECTUREOF A FAST PROGRAMMABLE TRANSPORT DEMULTIPLEXER USING DOUBLE BUFFERED APPROACH | Stephane Rodgers | May 31, 2005 |
| 11/348,563 | 60/685,781 | METHOD AND SYSTEM FOR ARCHITECTUREOF A FAST PROGRAMMABLE TRANSPORT DEMULTIPLEXER USING DOUBLE BUFFERED APPROACH | Stephane Rodgers | Feb. 07, 2006 |
| 60/685,986 | | Method for Sharing Audio/Video Recording Functions | Stephane Rodgers Dan Simon | May 31, 2005 |
| 11/385,468 16779US02 | 60/685,986 | Method for Sharing Audio/Video Recording Functions | Stephane Rodgers Dan Simon | Mar. 21, 2006 |
| 60/685,779 | | System and Method for Providing Common Format to Firmware | Stephane Rodgers | May 31, 2005 |
| 11/328,877 | 60/685,779 | System and Method for Providing Common Format to Firmware | Stephane Rodgers | Jan. 10, 2006 |
| 11/273,282 | | Using Navigational Hardware Assist to Speed Packet Processing | Stephane Rodgers Dan Simon | Nov. 14, 2005 |
| Atty. Docket No. 16902US01 | | Flexible Mapping of AV vs Record Channels in a Programmable Transport Demultiplexer/PVR | Stephane Rodgers Dan Simon | Mar. 31, 2006 |
| Atty. Docket No. 16917US01 | 60/685,781 11/348,563 | Using Generic Comparators with Firmware Interface to Assist Video/Audio Decoders in Achieving Framesync. | Stephane Rodgers | Mar. 21, 2006 |
| 11/344,329 | | Arbitration and Flow Control in a Programmable Transport Demultiplexer to Allow Maximum Firmware Throughput | Stephane Rodgers Rajesh Mamidwar | Jan. 31, 2006 |
| Atty. Docket No. 16909US01 | | Demultiplexing Different Stream Types in a Programmable Transport Demultiplexer | Stephane Rodgers Rajesh Mamidwar Ut Nguyen | Mar. 30, 2006 |
| 11/273,102 | | Maintaining Context Orthoganality and Flexible Content Mapping in a Programmable Transport Demultiplexer | Stephane Rodgers Dan Simon | Nov. 11, 2005 |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A transport stream can comprise multiplexed data from a variety of channels, and a variety of transponders. The data can then be provided to decoders for decoding and eventual presentation. The increasing number of channels and potential destinations place considerable demultiplexing demands on media systems.

The increasing number of input formats which must be supported also poses considerable demultiplexing and routing challenges. In particular, the presence of formats such as raw PES, ES, program stream, DVD, and others (including arbitrarily formatted non-transport data) do not lend themselves well to being multiplexed, demultiplexed and routed in combination with transport based formats.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for, method and apparatus for demultiplexing, merging, and duplicating packetized elementary stream/program stream/elementary stream/DVD data, and other non-transport based formats substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 5 is a block diagram of an exemplary Record Audio Video Engine in accordance with an embodiment of the present invention.

DETAILED DESCRIPTION OF THE INVENTION

Figure 1:
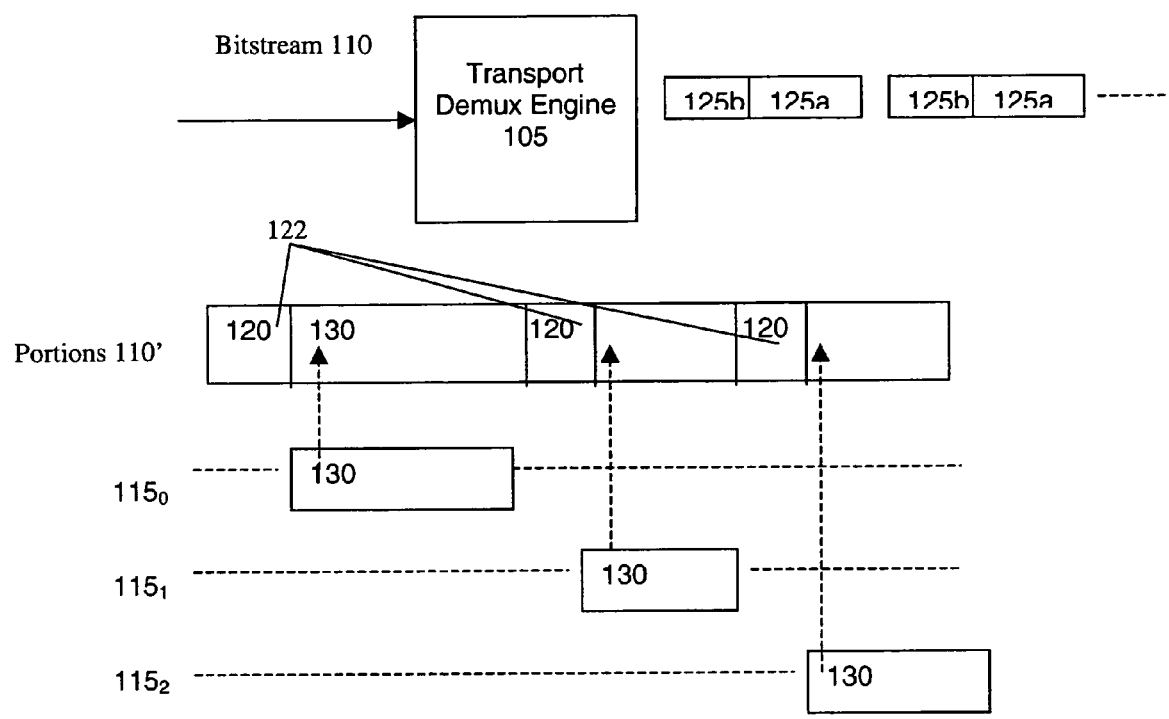
FIG. 1 is a block diagram of an exemplary circuit in accordance with an embodiment of the present invention.

Certain embodiments of the present invention relate to demultiplexing and routing video and audio signals. More specifically, certain embodiments of the invention relate to a method and system for demultiplexing and routing non-Transport based data when it arrives as part of a multiplexed stream together with Transport data.

In video/audio and PVR systems, it may be desirable for the transport demultiplexer to receive streams in a variety of different input formats, and to route them to many different destinations. For example, stream 1 from tuner 1 may be encapsulated in transport format 1, while stream 2 from tuner 2 may be encapsulated in transport format 2, and stream 3 from a non tuner source (say memory) may be encapsulated in a non-transport based format. These streams may be merged together into a single multiplexed stream and passed to a single transport demultiplexer, to route each stream to a separate final destination (e.g. video/audio decoder, or memory for access by software). Hereafter, the transport demultiplexer shall be referred to as RAVE (Record Audio Video Engine).

Since the RAVE splits its time between the different streams in order to service them all in a timely manner, the streams are structured as fixed length chunks of data (herein referred to as packets) which can be serviced as units. This makes it possible to service a small portion of stream 1 (say packet 1) followed by a small portion of stream 2 (say packet 2), etc, so that all streams are serviced at the required rates. Transport based formats lend themselves well to this demultiplexing because:

1) They are already split into packets
2) The information to route them to their final destination is embedded inside each packet.

With the preponderance of new formats and requirements, it may be desirable to process some non-transport based formats (e.g. PES/ES/Program stream/DVD, or arbitrarily formatted data) while simultaneously processing the transport data. However, there are multiple challenges associated with demultiplexing and routing non-Transport data when it coexists with transport data in the same stream. One problem is that the non-transport streams either do not have packet boundaries (in the case of ES or some generic formats), or the packet boundaries are so large and uncertain that multiplexing with other streams is made very difficult (e.g. PES). If the packet size of the non-transport data is infinite (i.e. no packet boundaries), or very large, the non-transport data will utilize excessive amounts of the bandwidth of the aggregate stream for long periods, precluding the interleaving of packets from transport based streams. This makes it difficult to process all the streams within the multiplexed aggregate in a timely manner.

For this reason, when non-transport data is multiplexed with other stream types, it is broken up into fixed length "chunks" of data which are not native to the data layer. However, this presents another problem. Within an individual non-transport stream, a special pattern may be seen which has the function of splitting the stream into two separate destinations. For example, in data which is input as raw PES, a PES header with a different stream ID may occur anywhere within the newly created packet. This results in a situation where part of the packet must be routed to one destination while another part must be routed to a second destination. This poses challenges for routing the final data, since it is desirable for data from any particular packet to go to only one destination. In addition to the above challenges, there is also the problem that unlike transport based formats, the non-transport data does not carry the routing information for every chunk of data within the packet. Thus, when individual packets of non-transport data are demultiplexed from the aggregate stream, there is no way to know where they are to be routed.

Transport data may normally be assigned to a logical PID channel. Logical PID channels are the result of decoding both the routing information inside the packet (e.g. PID for MPEG transport packets), plus the individual stream number. Whereas PIDS from multiple streams may be duplicated, when using both PID and stream number, the result is a logical PID channel which is unique in the system (since individual streams may not have duplicate PIDs).

Streams which have been assigned to individual PID channels can be merged with other streams, duplicated to multiple destinations, or sent to an individual destination. In addition, entire collections of streams (called bands) may be duplicated, merged, or sent to a destination in the same manner as individual streams.

In an embodiment of the invention, the non-transport data is packetized into standard MPEG transport packets with 188 byte length and all the usual syntax of MPEG packets. In addition, the individual non-transport streams may be given a PID and assigned a logical PID channel, just as with the transport data.

In another embodiment of the invention, the problem of having a pattern which splits the data routing (context) and occurs in the middle of the packet is solved for the case where the input stream type is raw PES, because the PES header will be aligned to the packet boundary, as it is for standard MPEG-2 packets.

In another embodiment of the invention, the problem of having a pattern which splits the data routing (context) and occurs in the middle of the packet is also solved for the case where the input stream type is an arbitrarily formatted stream. The solution to this problem for streams of arbitrary format comes from the routing choices that are now made available due to the mapping of the non-transport data to logical PID channels. Because of these routing choices, arbitrarily formatted streams which must be routed to different destinations based on patterns within the data may be duplicated to two (or more) contexts within the RAVE. In each context, data which belongs to one pattern may be dropped from the stream, whereas data from the other pattern is kept. This results in data from a single stream going to multiple destinations without having to split a single packet into multiple contexts.

Referring now to FIG. 1, there is illustrated block diagram of an exemplary circuit for processing data in accordance with an embodiment of the present invention. The circuit comprises a transport demultiplexing engine 105. The transport demultiplexing engine 105 receives a bitstream 110.

Portions 110' of the bitstream 110 can include data from a number of different streams $115_0, 115_1, 115_2, \ldots, 115_n$. A stream 115 can include, for example, data from a file, video data from a program, or audio data from a particular channel for a program, to name a few.

The portions 110' of the streams 115 can include a stream header 120. The stream header 120 can include an identifier 122 that identifies the particular one of the streams to which the portion 110' belongs. Generally, portions 110' of the bitstream 110 are associated with the same stream 115 and the immediately preceding portion 110' if the portion 110' does not include stream header 120. The number of consecutive bytes in the bitstream 110 that can be associated with a particular stream 115 is not necessarily constant and may be varied.

Non-transport data is converted to MPEG-2 transport packets upstream of the RAVE. Once this has been done, the transport demultiplexing engine will take 105 in a wide variety of formats, including for example, original transport data, packetized elementary stream, program streams, and elementary stream data, to name a few. However, all of the non-transport data has been converted to transport packets, so that the aggregate stream seen by RAVE consists of transport packets, each with its own logical PID channel. This data may arrive together in the bitstream 110. The transport demultiplexing engine 105 can split the incoming data into separate downstream destinations, hereafter referred to as "contexts".

Because the number of consecutive bytes in the bistream 110 that can be associated with a particular stream 115 can be varied, the stream headers 120 can occur at any place within the bitstream 110. The transport demultiplexing engine 105 receives the bitstream 110 comprising the plurality of streams 115 and maps the plurality of streams 115 to identifiers and 115 packets 125 comprise data 130 from only one of the plurality of streams 115 and an identifier 135 that is mapped to the streams.

In certain embodiments, the identifiers 135 can be a field in a header 140. In certain embodiments of the present invention, the packets 125 can be fixed length.

In certain embodiments of the invention, individual non-transport streams which must be split to multiple contexts based on patterns within the data may be first duplicated to multiple contexts using the PID channel. Then, each individual RAVE context may drop selected data so that only data before the pattern may be sent to buffer A, whereas only data after the pattern may be sent to buffer B. This has the effect of splitting the stream based on patterns within the data, without splitting individual packets.

In certain embodiments of the present invention, the transport demultiplexing engine 105 can determine the stream associated with portions 110, by examining the portion 110' for a stream header 120. If the portion 110' includes a stream header 120, all successive portions 110' are associated with the stream identified by the stream identifier 122 in the stream header, until another portion 110' is encountered with another stream header 120. That portion 110' and all successive portions 110' of the bitstream are associated with the stream identified by the stream identifier 122.

Figure 2:
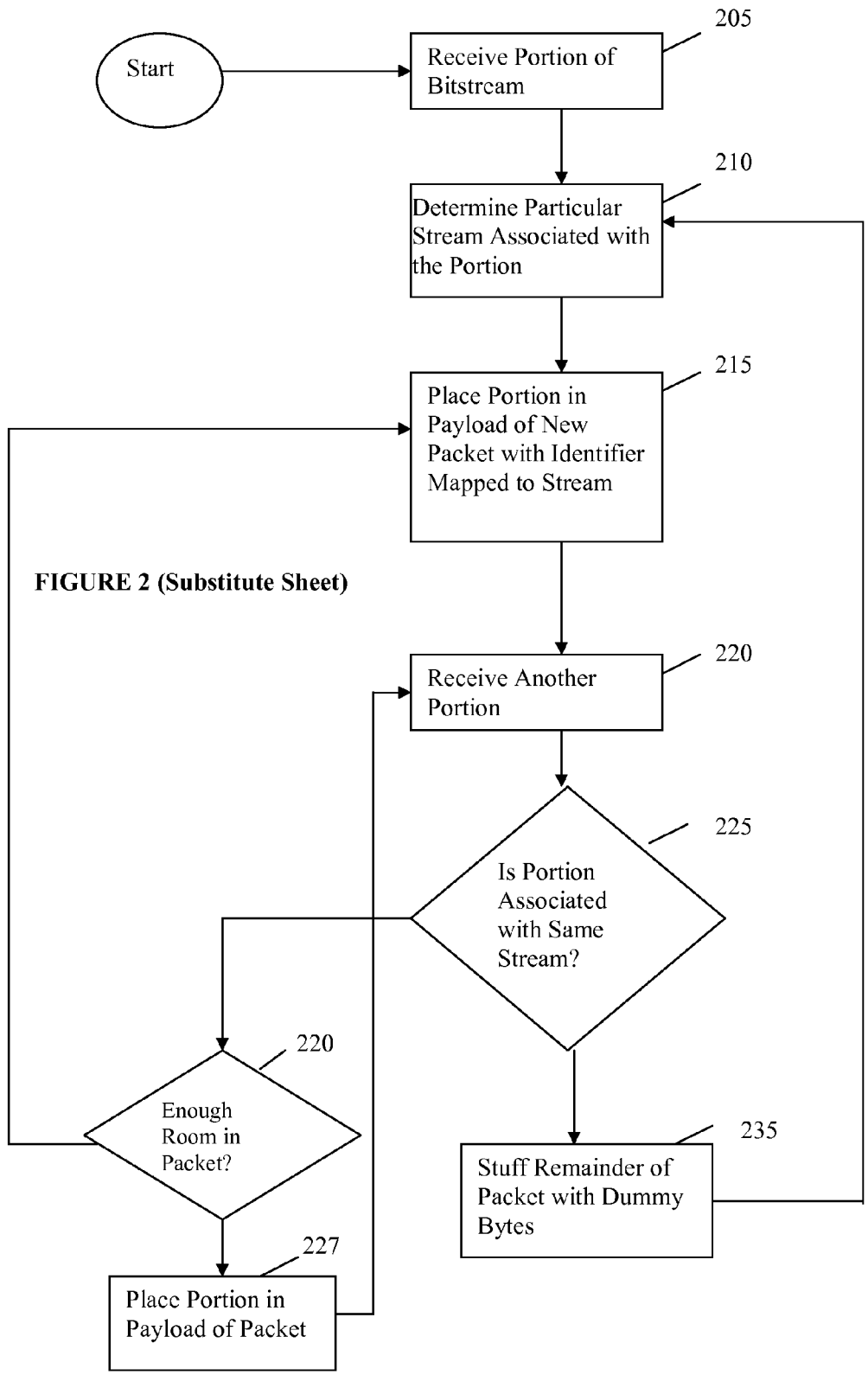
FIG. 2 is a flow diagram for processing data in accordance with an embodiment of the present invention.

Referring now to FIG. 2, there is illustrated a flow diagram for processing data in accordance with an embodiment of the present invention. At 205, the transport demultiplexing engine 105 receives a portion 110' of a bitstream 110. The bitstream 110 comprises data from a plurality of streams 115.

At 210, the demultiplexing engine 105 determines the particular stream 115 associated with the portion 110' and maps the stream 115 to an identifier. At 215, the transport demultiplexing engine 105 places the portion 110' in the payload 125a of a new packet 125, with the identifier mapped to the stream.

At 220, the demultiplexing engine 105 receives another portion 110' of the bitstream 110 and determines if the stream associated with the portion 110' is the same as the stream associated with the previous portion at 225.

In certain embodiments of the present invention, the transport demultiplexing engine 105 can determine if the portion 110' is associated with the particular stream 115 by examining the portion 110' for a stream header 120. If the portion 110' does not include a stream header 120, the transport demultiplexing engine 105 determines the portion is associated with the stream. If the portion 110' includes a stream header 120, the transport demultiplexing engine 105 examines the stream identifier 122 to determine whether the portion 110' is associated with the particular stream or another stream.

If at 225, the portion 110' is associated with the particular stream, the transport demultiplexing engine 105 places the portion 110' into the payload 125a of the packet 125. Successive portions 110' that are associated with the particular stream 115 are placed in the payload of the packet 125a until the packet payload 125a does not have enough capacity to store the portion 110' (230). When the packet payload 125a does not have the capacity to store the portion 110', that amount of the portion 110' that can be placed into the packet payload 125a is placed into the packet payload 125a, and the transport demultiplexing engine 105 returns to 215.

If at 225, the portion 110' is associated with another stream, the transport demultiplexing engine 105 stuffs the remaining portion of any partially filled payload 125a (at 235) and returns to 210.

The present invention can be used to process a variety of data. For example, certain embodiments of the present invention can be used to demultiplex multimedia data that is received on a shared channel.

Figure 3:
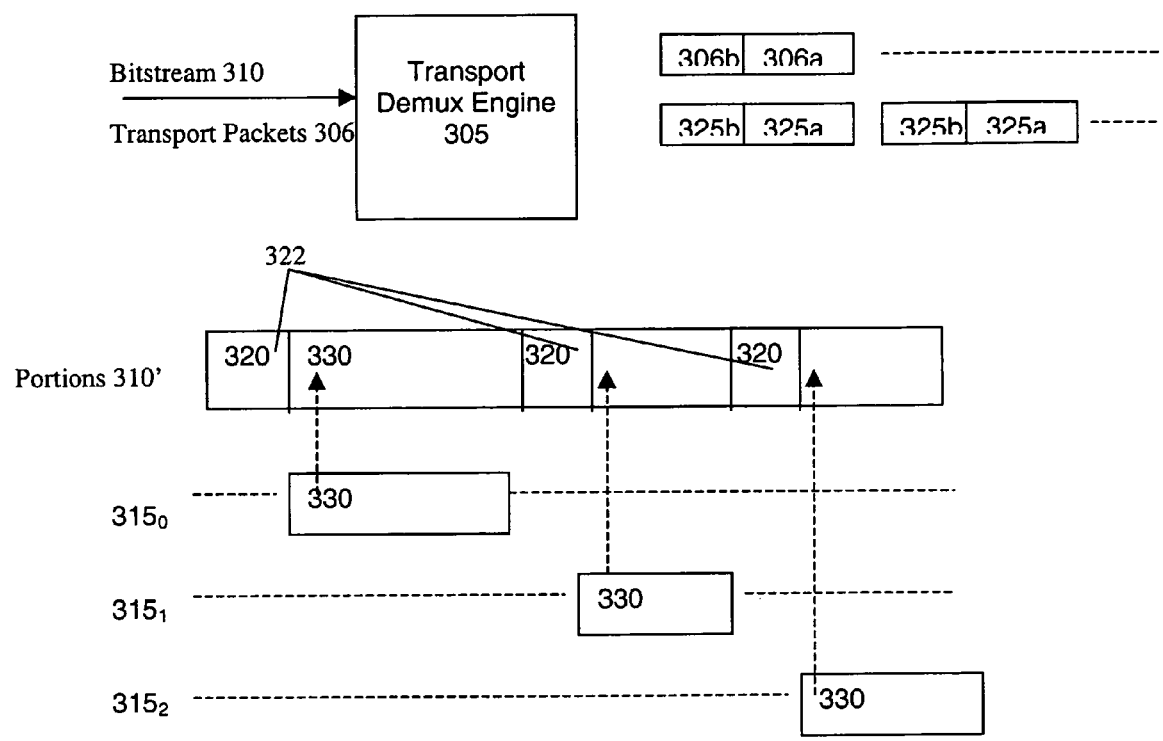
FIG. 3 is a block diagram of an exemplary circuit for processing video data in accordance with an embodiment of the present invention.

Referring now to FIG. 3, there is illustrated a block diagram of an exemplary circuit for processing video data in accordance with an embodiment of the present invention. The circuit comprises a Record Audio Video Engine (RAVE) 305 receiving multiplexed multimedia data on a data pipe.

The data pipe provides a bitstream 310 that includes unpacketized data, as well as transport packets 306. Portions 310' of the unpacketized data in the bitstream 310 can include data from a number of different streams $315_0$, $315_1$, $315_2$, ..., $315_n$. A stream 315 can include, for example, a Packetized Elementary Stream (PES), a Program Stream, or an Elementary Stream, to name a few.

The unpacketized portions 310' of the bitstreams 310 can include a PES header 320. The PES header 320 can include a field, StreamID 322 that identifies the particular one of the streams to which the unpacketized portion 310' belongs. Generally, unpacketized portions 310' of the bitstream 310 are associated with the same stream 315 as the immediately preceding unpacketized portion 310' if the unpacketized portion 310' does not include PES header 320. The number of consecutive unpacketized bytes in the bitstream 310 that can be associated with a particular stream 315 is not necessarily constant and may be varied.

The RAVE 305 routes the data received on the data pipe to any number of decoders. The decoders can comprise, for example, audio decoder or video decoders for presenting data. The RAVE 305 can split the incoming data into separate downstream destinations, hereafter referred to as "contexts".

The transport packets 306 include a transport payload 306a and a transport header 306b. The transport header 306a includes a number of fields, including a program identifier (PID) channel that maps the data in the transport packet payload 306b to a particular program.

However, because the number of consecutive bytes in the unpacketized portions 310' that can be associated with a particular stream 315 can be varied, the PES headers 320 can occur at any place within the bitstream 310. The RAVE 305 receives the bitstream 310 comprising the plurality of streams 315 and maps the plurality of streams 315 to PID channels, and packetizes the plurality of streams 115 into additional transport packets 325. The transport packets 325 comprise data 330 from only one of the plurality of streams 315 and the PID channel field that is mapped to the streams.

According to certain embodiments of the present invention, the RAVE 305 packetizes the streams 315 by determining the particular stream 315 that is associated with an unpacketized portion 310' of the bitstream 310 and places the unpacketized portion of the bitstream 310' in the payload 325a of a one of the packets. The RAVE 305 places each successive portion 310' of the bitstream 110 that is associated with the same stream 315 is placed in the payload 325a of the packet 325, until the payload 325a of the packet is filled to capacity. At this point, the portions 310' are placed in the payload 325a of another packet 325.

When the RAVE 305 encounters a portion 310' that is associated with another stream 315, the RAVE 305 places the portion 310' in a payload of another packet 325 with an PID channel identifying the stream associated with the portion 310'. In certain embodiments of the invention, the RAVE 305 can stuff the remaining capacity of the first packet with dummy bytes.

In certain embodiments of the present invention, the RAVE 305 can determine the stream associated with unpacketized portions 310' by examining the unpacketized portion 310' for a PES header 320. If the unpacketized portion 310' includes a PES header 320, all successive unpacketized portions 310' are associated with the stream identified by the streamID 322 PES header 320, until another unpacketized portion 310' is encountered with another PES header 320. That portion 310' and all successive portions 310' of the bitstream are associated with the stream identified by the streamID 322.

The transport packets 306 and the transport packets 325 (packetizing the originally unpacketized portions 310') can be routed to different destinations. The RAVE 305 uses a memory 340 to maps the transport packets 306 and transport packets 325 to different contexts. The decoders 333 can use the different contexts.

In certain embodiments of the present invention, the RAVE 305 can map the transport packets 306 and transport packets 325 as described in "METHOD AND APPARATUS FOR DEMULTIPLEXING, MERGING, AND DUPLICATING PACKETIZED ELEMENTARY STREAM/PROGRAM STREAM/ELEMENTARY STREAM DATA", Ser. No. 11/273,102, filed Nov. 11, 2005, by Rodgers, et. al., which is incorporate by reference herein in its entirety for all purposes.

Figure 4:
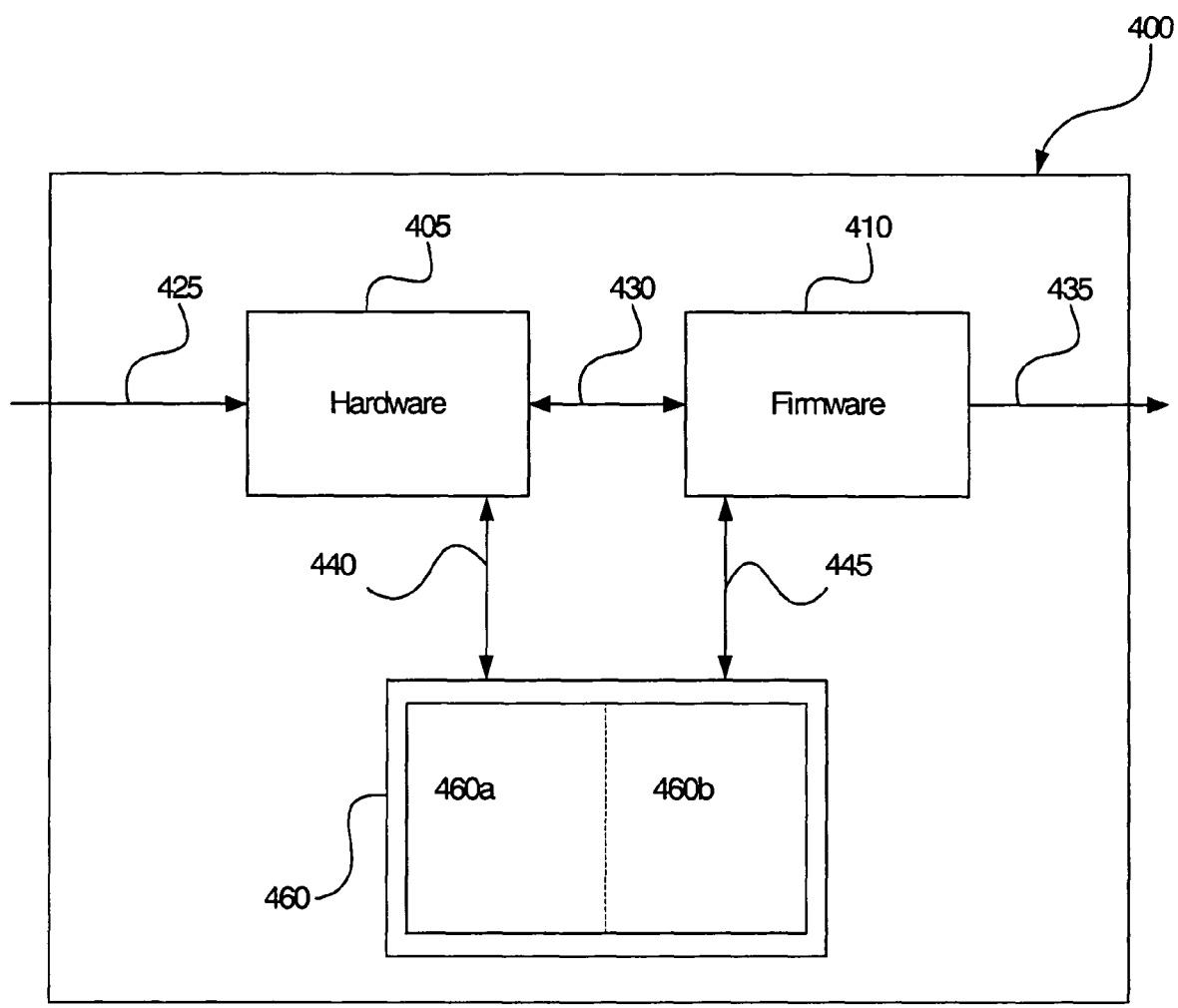
FIG. 4 is an exemplary architecture for a Record Audio Video Engine in accordance with an embodiment of the present invention.

FIG. 4 illustrates a block diagram of exemplary architecture of the RAVE 400, in accordance with an embodiment of the present invention. The RAVE 400 may comprise a hardware assist block 405, a firmware block 410, and a RAVE buffer 460.

The hardware assist block 405 may perform some processes and pass processed data to firmware block 410 via the RAVE buffer 460. A portion of the processed data may be passed from the hardware assist block 405 via data path 440 to the RAVE buffer 460, which may then be accessed by the firmware block 410 via data path 445.

Several schemes may be utilized for interfacing the hardware assist block 405 with the firmware block 410. To increase flexibility and allow for subsequent algorithmic changes, and to maintain high throughput, one or more schemes may be utilized within a RAVE. Using the combination of hardware assist and firmware, the RAVE may provide the flexibility associated with programmability of firmware, and the speed associated with hardware. The hardware assist 405 and the firmware 410 may be interfaced such that speed and programmability may be maintained simultaneously.

In one embodiment of the present invention, one approach may be to have incoming transport packets examined by both the hardware assist 405 and the firmware 410. The hardware assist 405 may provide signals comprising information regarding each byte of the incoming transport packets as they are received. The information may indicate, for example, the type of byte or the location of the byte, such as, for example, the start of the code, etc. The firmware 410 may then read the signals provided by the hardware assist 405 and based on the received signals make a decision as to whether the received byte is to be processed using functions available in the firmware 410 or other algorithms.

For example, as a transport packet comes in, the hardware assist 405 may examine the data, and may look for a data pattern. When the hardware assist 405 sees the pattern it may send a trigger signal to the firmware 410. The trigger signal may be, for example, an interrupt. The firmware 410 may then use the interrupt to begin a process associated with the identified pattern.

In one embodiment of the present invention, another approach may be for the hardware assist 405 to perform major functions, and allow for certain functions to be performed by the firmware 410. The hardware assist 405 may process a portion of the incoming transport packets and the firmware 410 may process the remaining portion of the incoming transport packets.

In one embodiment of the present invention, the hardware assist 405 may perform major functions, or portions thereof. The functions associated with incoming transport packets may be broken down into sub-functions. The hardware assist 405 may perform major functions and/or sub-functions. The firmware 410 may perform a remaining portion of the functions and/or sub-functions.

In one embodiment of the present invention, the hardware assist 405 may operate on an incoming transport packet, and may output data regarding the processed transport data to a particular portion of the RAVE buffer 460a. During the next packet time, i.e., when the next incoming transport packet is being processed by the hardware assist 405, the firmware 410 may retrieve and process the previous transport packet and associated data from the portion of the RAVE buffer 460a.

In another embodiment of the present invention, the hardware assist 405 may process functions that may be less likely to change such as, for example, MPEG parsing, and the firmware 410 may make most or all of the final decisions of the RAVE 400. Functions that may change as a result of, for example, a new data format may be processed mainly by the firmware 410 with some processing that may be done by the hardware assist 405.

The hardware assist 405 may perform a portion of the functions associated with the processing of the transport packet A, and may retrieve information associated with the transport packet A as well. The hardware assist 405 may then set up the hardware assist fields and may write retrieved information to a portion of the RAVE buffer 460a.

The hardware assist field may comprise, for example, address of compare pattern, compare patterns, start/end of PES headers, number of ES bytes in the packet, number of payload bytes in the packet, start of payload, presence of packet errors, type of packet (record or audio/video), etc. These fields and their uses are explored further in "METHOD AND SYSTEM FOR SHARING AV/RECORD RESOURCES IN A PROGRAMMABLE TRANSPORT/ DEMULTIPLEXER AND PVR ENGINE" U.S. patent application Ser. No. 11/385,468 filed Mar. 21, 2006 and "SYSTEM AND METHOD FOR PROVIDING DATA COMMONALITY IN A PROGRAMMABLE TRANSPORT DEMULTIPLEXER ENGINE" U.S. patent application Ser. No. 11/328,877 filed Jan. 10, 2006, each of which are incorporated herein by reference in its entirety.

After the hardware assist 405 performs the portion of the functions assisted with the first transport packet A, the firmware 410 may then access and begin processing the data associated with the first transport packet A from the portion of the RAVE buffer 460a, and write the processed data to the portion of the RAVE buffer 460a. Meanwhile, while the firmware 410 is processing the previously received first transport packet A, the hardware assist 405 may process transport packet B (a second transport packet) and write the associated retrieved data another portion of the RAVE buffer 460 such as, for example, a portion 460b. The firmware 410 may then begin processing the transport packet B from the portion 460b of the RAVE buffer 460, and the hardware assist 405 may process the next transport packet C (a third transport packet) and write the associated information in portion of RAVE buffer 460a, overwriting the data associated with the transport packet A previously processed by the firmware 410.

In certain embodiments of the present invention, for unpacketized portions 310', the hardware assist 405 may packetized the unpacketized portion 310' into transport packets with a PID channel and data from only one of the streams 315.

FIG. 5 illustrates a block diagram of an exemplary RAVE, in accordance with an embodiment of the present invention. The RAVE may comprise hardware assist 505 and firmware 510. The hardware assist 505 may preprocess incoming data packets, to provide them in a common format to the firmware 510. The hardware assist 505 may comprise transport parsing such as, for example, MPEG transport parsing 515, DirecTV transport parsing 520, and DVD/program stream parsing 525.

Incoming transport packets may be input into the associated transport parsing unit. For example, if the incoming transport packet comprises MPEG data, then the transport packet is handled by the MPEG transport parsing 515.

The parsing unit that handles the incoming transport packet may then output the information for further parsing according to the type of information such as, for example, error, adaptation field, PES, PTS/DTS, ES byte location, and stream pattern comparison.

Therefore, the output from the initial parsing units (the MPEG transport parsing 515, the DirecTV transport parsing 520, and the DVD/program transport parsing 525) may be input into one or more of error parsing 540, adaptation field parsing 545, PES parsing/PTS-DTS extraction 550, ES byte location 555, and Stream Pattern Comparison 560.

The resulting parsed information may then be sent to a hardware assist memory manager 530, where the information may be organized and saved to the data/hardware assist memory 535. The parsed information may comprise, for example, errors, PES Start/End, PTS/DTS, PES Extension Start, Adaptation Num Bytes, Payload Start, Compare Pattern Value, Compare Pattern Location, ES Packet Byte Offset, ES Num Bytes, and ES Format. The parsed information may then be retrieved by the firmware 510, from the memory 535. The information retrieved by the firmware 510 may have a common format, and therefore, the firmware 510 may process the packets the same way regardless of their original format.

The embodiments described herein may be implemented as a board level product, as a single chip, application specific integrated circuit (ASIC), or with varying levels of the system integrated with other portions of the system as separate components. Alternatively, if the processor is available as an ASIC core or logic block, then the commercially available processor can be implemented as part of an ASIC device wherein certain aspects of the present invention are implemented as firmware.

The degree of integration may primarily be determined by the speed and cost considerations. Because of the sophisticated nature of modern processors, it is possible to utilized a commercially available processor, which may be implemented external to an ASIC implementation.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for processing data, said method comprising:
 receiving a bitstream wherein said bitstream comprises a plurality of streams at a device connected to a decoder;
 mapping the plurality of streams to a plurality of identifiers;
 packetizing the plurality of streams at the device connected to the decoder into transport packets, thereby resulting in a plurality of transport packets, and wherein each transport packet further comprises:
  a portion of only one of the plurality of streams; and
  a particular one of the identifiers, wherein the particular one of the identifiers is mapped to the only one of the plurality of streams; and
 wherein the device is at a same terminal as the decoder.

2. The method of claim 1, wherein packetizing further comprises:
   determining a particular one of the plurality of streams that is associated with a portion of the bitstream;
   placing a first portion of the bitstream in a payload of a one of the plurality of transport packets;
   determining if a second portion of the bitstream that follows the first portion is associated with the particular one of the plurality of streams or if the second portion of the bitstream is associated with another one of the plurality of streams;
   placing the second portion of the bitstream, the second portion of the bitstream following the first portion, in the payload of the one of the plurality of transport packets if the second portion is associated with the particular one of the plurality of bitstreams and if the payload has enough capacity to hold the second portion.

3. The method of claim 2, wherein the first portion and the second portion comprise at least one byte.

4. The method of claim 2, further comprising:
   if the second portion is associated with another stream:
      placing the second portion in a payload of another packet with an identifier identifying the another stream; and
      stuffing remainder of the payload of the packet.

5. The method of claim 2, further comprising:
   if the second portion is associated with the stream, and if the payload does not have enough capacity to hold the second portion:
      placing that amount of the second portion that the payload has enough capacity to hold, and
      placing remainder of the second portion in a payload of another packet, wherein the another packet includes an identifier identifying the stream.

6. The method of claim 2, wherein determining whether the second portion of the bitstream is associated with the particular stream or another stream further comprises:
   determining that the second portion of the bitstream is associated with another stream if the second portion of the bitstream includes a stream header indicating a different stream from the particular stream.

7. The method of claim 1, wherein the identifiers comprise Program Identifiers (PID).

8. The method of claim 1, further comprising:
   demultiplexing the bitstream with a demultiplexer; and
   wherein the packetizing the plurality of streams at the device connected to the decoder, thereby resulting in the plurality of packets, further comprises:
      packetizing the plurality of streams that were demultiplexed by the demultiplexer.

9. The method of claim 8, wherein receiving the bitstream comprising the plurality of streams further comprises receiving a bitstream comprising non-transport streams.

10. The method of claim 9, wherein the non-transport streams are received at a demultiplexer prior to demultiplexing and comprise packetized elementary streams.

11. The method of claim 8, wherein receiving the bitstream, comprises receiving the bitstream wherein some of the plurality of streams are unpacketized.

12. The method of claim 11, wherein the some of the unpacketized streams are received at a demultiplexer prior to demultiplexing.

13. The method of claim 1, wherein the device is proximately connected to the decoder.

14. The method of claim 1, wherein the device is operably coupled to the decoder.

15. A circuit for processing data, said circuit comprising:
   a hardware assist connected to a decoder operable to:
      receive a bitstream wherein said bitstream comprises a plurality of streams;
      map the plurality of streams to a plurality of identifiers;
      packetize the plurality of streams into fixed length packets, thereby resulting in a plurality of packets, and wherein each packet further comprises:
         a portion of only one of the plurality of streams; and
         a particular one of the identifiers, wherein the particular one of the identifiers is mapped to the only one of the plurality of streams; and
      wherein the hardware assist is at a same terminal as the decoder.

16. The circuit of claim 15, wherein packetizing further comprises:
   determining a particular one of the plurality of streams that is associated with a portion of the bitstream;
   placing a first portion of the bitstream in a payload of a one of the plurality of packets;
   determining if a second portion of the bitstream that follows the first portion is associated with the particular one of the plurality of streams or if the second portion of the bitstream is associated with another one of the plurality of streams;
   placing the second portion of the bitstream, the second portion of the bitstream following the first portion, in the payload of the one of the plurality of packets if the second portion is associated with the particular one of the plurality of bitstreams and if the payload has enough capacity to hold the second portion.

17. The circuit of claim 16, wherein the first portion and the second portion comprise at least one byte.

18. The circuit of claim 16, wherein the hardware assist is further operable to:
   if the second portion is associated with another stream:
      place the second portion in a payload of another packet with an identifier identifying the another stream; and
      stuff remainder of the payload of the packet.

19. The circuit of claim 16, wherein the hardware assist is further operable to:
   if the second portion is associated with the stream, and if the payload does not have enough capacity to hold the second portion:
      place that amount of the second portion that the payload has enough capacity to hold, and
      place remainder of the second portion in a payload of another packet, wherein the another packet includes an identifier identifying the stream.

20. The circuit of claim 16, wherein determining whether the second portion of the bitstream is associated with the particular stream or another stream further comprises:
   determining that the second portion of the bitstream is associated with another stream if the second portion of the bitstream includes a stream header indicating a different stream from the particular stream.

21. The circuit of claim 15, wherein the packets comprise transport packets.

22. The circuit of claim 15, wherein the identifiers comprise Program Identifiers (PID).

23. The circuit of claim 15, wherein the plurality of packets have a fixed length.

24. The circuit of claim 15, wherein the hardware assist is proximately connected to the decoder.

25. The circuit of claim 15, wherein the hardware assist is operably coupled to the decoder.

26. A method for processing data, said method comprising:
receiving a bitstream wherein said bitstream comprises a plurality of streams at a device connected to a decoder;
mapping the plurality of streams to a plurality of identifiers;
packetizing the plurality of streams at the device connected to the decoder into transport packets, thereby resulting in a plurality of transport packets, and wherein each transport packet further comprises:
a portion of only one of the plurality of streams;
a particular one of the identifiers, wherein the particular one of the identifiers is mapped to the only one of the plurality of streams;
demultiplexing the bitstream with a demultiplexer; and
packetizing the plurality of streams that were demultiplexed by the demultiplexer; and
wherein receiving the bitstream comprising the plurality of streams further comprises receiving a bitstream comprising non-transport streams; and
wherein the non-transport streams are received at a demultiplexer prior to demultiplexing and comprise packetized elementary streams.

27. The method of claim 26, wherein packetizing further comprises:
determining a particular one of the plurality of streams that is associated with a portion of the bitstream;
placing a first portion of the bitstream in a payload of a one of the plurality of transport packets;
determining if a second portion of the bitstream that follows the first portion is associated with the particular one of the plurality of streams or if the second portion of the bitstream is associated with another one of the plurality of streams;
placing the second portion of the bitstream, the second portion of the bitstream following the first portion, in the payload of the one of the plurality of transport packets if the second portion is associated with the particular one of the plurality of bitstreams and if the payload has enough capacity to hold the second portion.

28. The method of claim 27, wherein the first portion and the second portion comprise at least one byte.

29. The method of claim 27, further comprising:
if the second portion is associated with another stream:
placing the second portion in a payload of another packet with an identifier identifying the another stream; and
stuffing remainder of the payload of the packet.

30. The method of claim 27, further comprising:
if the second portion is associated with the stream, and if the payload does not have enough capacity to hold the second portion:
placing that amount of the second portion that the payload has enough capacity to hold, and
placing remainder of the second portion in a payload of another packet, wherein the another packet includes an identifier identifying the stream.

31. The method of claim 27, wherein determining whether the second portion of the bitstream is associated with the particular stream or another stream further comprises:
determining that the second portion of the bitstream is associated with another stream if the second portion of the bitstream includes a stream header indicating a different stream from the particular stream.

32. The method of claim 26, wherein the identifiers comprise Program Identifiers (PID).

33. The method of claim 26, wherein the device is proximately connected to the decoder.

34. The method of claim 26, wherein the device is operably coupled to the decoder.

35. A circuit for processing data, said circuit comprising:
a hardware assist connected to a decoder operable to:
receive a bitstream wherein said bitstream comprises a plurality of streams;
map the plurality of streams to a plurality of identifiers;
packetize the plurality of streams into fixed length packets, thereby resulting in a plurality of packets, and wherein each packet further comprises:
a portion of only one of the plurality of streams; and
a particular one of the identifiers, wherein the particular one of the identifiers is mapped to the only one of the plurality of streams; and
wherein the hardware assist is proximate to the decoder.

36. The circuit of claim 35, wherein a terminal comprises the hardware assist and the decoder.

37. A method for processing data, said method comprising:
receiving a bitstream wherein said bitstream comprises a plurality of streams at a device connected to a decoder;
mapping the plurality of streams to a plurality of identifiers;
packetizing the plurality of streams at the device connected to the decoder into transport packets, thereby resulting in a plurality of transport packets, and wherein each transport packet further comprises:
a portion of only one of the plurality of streams; and
a particular one of the identifiers, wherein the particular one of the identifiers is mapped to the only one of the plurality of streams; and
wherein the device is proximate to the decoder.

38. The method of claim 37, wherein a terminal comprises the hardware assist and the decoder.

* * * * *